Patented Feb. 13, 1934

1,947,415

UNITED STATES PATENT OFFICE 1,947,415

COATING COMPOSITION AND METHOD OF MAKING THE SAME

Adolf Heck, Kansas City, Mo., assignor to Cook Paint & Varnish Company, Kansas City, Mo., a corporation of Delaware No Drawing. Application January 6, 1931
Serial No. 506,981

10 Claims. (Cl. 134—26)

This invention relates to coating compositions and methods of making the same; and it comprises processes of condensing together an oxidized drying oil, such as those obtained from linseed oil, fish oil, perilla oil, soy bean oil, tung oil etc., a phenol, such as phenol itself, cresol, "cresylic acid" cyclohexanone, naphthols, etc., an aldehyde such as formaldehyde, acetaldehyde, benzaldehyde etc., and a minor amount of a natural acid resin, such as rosin or colophony, soft Manila copal, etc., said condensation taking place in the presence of a basic catalyst; and it also comprises the products produced by said processes, and the coating compositions produced by dissolving said products in hydrocarbon oils such as xylol and toluol, with or without the use of a drying oil; all as more fully hereinafter set forth and as claimed.

Many resinous products produced from phenols and formaldehyde in the presence of a basic catalyst, are known but without exception the final condensation product is more or less brittle. These condensation products are not miscible with ordinary drying oils and it is impossible to make blended compositions, such as are wanted in many relations. Further, surfaces coated with these resinous products do not as a rule give a good bond or union with coatings containing drying oil.

I have discovered various methods for making technically useful resinous condensation products containing oxidized drying oils. One of these methods which is described in a prior German application No. B 126,206 comprises condensing together oxidized drying oils, phenol and formaldehyde, the phenol and formaldehyde being used in about equi-molecular proportions and an alkaline catalyst being used. This process results in a product soluble in low molecular solvents, ketones, ethers, alcohols, etc., and also soluble in mixed solvents, one of whose components is a hydrocarbon oil, such a mixed solvent as a mixture of alcohol and benzol, for instance. These products, however, are not soluble in hydrocarbon oils of the aromatic type, such as xylol and toluol, when these are used alone.

In another and copending application, Ser. No. 506,980 I have described another process of condensing together, in the presence of an alkaline catalyst, oxidized drying oils (with the exception of tung oil), phenols and aldehydes, the molecular ratio of the aldehyde to the phenol being about 0.5:1. These processes result in a product which is soluble in these aromatic hydrocarbon oils alone, as well as in the other solvents mentioned.

Both of the described compositions made from phenol, formaldehyde and oxidized drying oil are useful. They have, however, different properties to some extent, as regards miscibility with solvents. This renders them useful in different fields of the art. Either type of composition may be used in the present invention; that of the German application, with the relatively large amount of formaldehyde, or that of the copending application, with the less amount of formaldehyde.

The present invention represents a still further advance in increasing the solubility of these resinous condensation products. None of the above described products is miscible with drying oils and they have therefore no utility in the field of oil varnishes, for example. I have discovered that this immiscibility or insolubility of the stated products in drying oils can be obviated if a little rosin or similar natural resin is added to the mixture of phenol and oxidized oil prior to the condensation. As in the two prior inventions condensation takes different courses with different ratios of formaldehyde; but in each, with rosin present in the sphere of reaction, solubility in drying oil results; the products are miscible with oil varnish compositions. In the presence of a small amount of rosin, the resinous product of reaction is soluble in linseed oil and other drying oils. Coatings made with these resinous condensation products can be used as undercoats or overcoats for paints, varnishes and lacquers containing drying oils. Bonding is good.

In making compositions under the present invention any oxidized drying oil may be employed as a starting material. These oxidized drying oils may be obtained in the usual manner by air blowing a raw drying oil until it has become substantially oxidized. These oxidized oils are frequently termed "blown" oils. I ordinarily use either oxidized tung oil (wood oil) or oxidized linseed oil, but I have also used oxidized perilla oil, soy oil, blown fish oil, etc. As the phenol component I ordinarily use either phenol itself or cyclohexanone, or a cresol such as meta cresol, but I sometimes employ naphthols. Ortho and para cresols or commercial "cresylic acid" are also useful. As the resin component I ordinarily use commercial rosin or colophony but other resins, such as soft Manila copal, may be employed.

In a typical embodiment of the present invention 100 parts by weight of commercial phenol were warmed to between 90° and 100° C. and an equal weight of oxidized linseed oil stirred in gradually. Complete solution took place. To this solution I next added 25 parts of good commercial resin and 50 parts of commercial 40 per cent formaldehyde solution. Three parts by weight of concentrated aqueous ammonia were added as a catalyst. The mixture was heated for an hour at constant volume, that is under a reflux. The water was then distilled off and the residue heated somewhat to thicken it. Thickening can be carried as far as may be desired within limits, but in this particular instance heating was continued until the residue was about the consistency of honey. This took about three hours.

The material obtained in the manner just described was a yellow resinous material; soluble in drying oils and in benzol, toluol, xylol and other coal tar distillates. A solution in xylol or toluol forms a useful varnish, drying quickly and leaving a film becoming harder with time. The resin being soluble in linseed oil and other drying oils, these oils may be added to the xylol solution in any proportion desired in order to produce particular coating compositions of definite drying type. Ordinarily, however, to obtain the advantages of the new type of coating resin, it is inadvisable to use more drying oil than perhaps an equal weight; and generally I do not use more than one part of drying oil to four parts of resin. Xylol solutions of the resin may be made of any strength desired, but ordinarily a solution of resin in an equal weight is most desirable. Such a mixture has a desirable consistency for many coating purposes, as for coating tin plate, wire, etc. Spraying machines may be used for applying the coating; or dip coating may be employed.

In the example given the commercial phenol can be replaced by about equal amounts of cresol, cresylic acid (commercial crude cresols) and various naphthols. Cyclohexanone can be used. If the amount of phenol is kept constant in the mixture the amount of oxidized linseed oil can be varied between 80 and 120 parts to produce advantageous products. Various aldehydes such as acetaldehyde, benzaldehyde etc. can be substituted for the formaldehyde. The aldehyde content can be varied between about 25 and 100 parts. The molecular ratio of aldehyde to phenol used varies from about unity to one quarter. The resin content can be reduced to about 15 parts before the products become insoluble in drying oils. When the proportion of resin is increased above 50 parts the products tend to become brittle. Natural resins such as soft Manila copal can be substituted for the rosin. Alkali metal carbonates can be used as catalysts in place of the ammonia. When cyclohexanone is employed, caustic alkali catalysts are best.

My new materials produced as above described find many uses in the technical arts. A solution of the condensation product in xylol forms an advantageous varnish. On account of the low viscosity of the product, solutions bodied with up to 50 per cent of solids can be employed before the viscosity becomes objectionable. The coatings may be air dried or may be baked at elevated temperatures to reduce the time. Temperatures of 140° to 160° C. may be used. The baking hardens the film and renders it insoluble in all the usual solvents. It still retains its high flexibility and coated metal articles can be bent, stamped or punched without damaging the coat.

The coating adheres very tenaciously to metal. This makes my coating highly desirable as an undercoat to lacquers, oil varnishes and paints. These compositions bond extremely well to such an undercoat. I attribute this bonding property to the solubility or miscibility of drying oils with my products. Outer coats containing drying oils apparently penetrate my undercoats to some extent, keying firmly to the latter.

My condensation products form a valuable ingredient for many of the oil varnishes now on the market. The flexibility of the coating is markedly increased by their presence. When a solvent containing a drying oil is used for my condensation products, a superior oil varnish results. It is generally advisable to incorporate plasticizers, such as tricresyl phosphate, castor oil etc. Dryers such as manganese dioxide, resinates etc. can be employed.

What I claim is:

1. As new compositions of matter, the reaction products, in the presence of an alkaline catalyst, of an oxidized drying oil with about equal amounts of a phenol, with a natural resin and with an aldehyde, the molecular ratio of the aldehyde to the phenol varying from about one to one fourth, the products being soluble in light hydrocarbon oils and in drying oils.

2. As new compositions of matter, the reaction products, in the presence of an alkaline catalyst, of an oxidized drying oil selected from a class consisting of linseed oil, fish oil, tung oil, perilla oil and soy bean oil, with about equal amounts of a phenol selected from a class consisting of phenol itself, cresol, cyclohexanone, naphthols and cresylic acid, with a natural resin selected from a class consisting of rosin, colophony and soft Manila copal, and with an aldehyde selected from a class consisting of formaldehyde, acetaldehyde and benzaldehyde; the molecular ratio of the aldehyde to the phenol varying between about one and one quarter, the products being soluble in light hydrocarbon oils and in drying oils.

3. As new compositions of matter, the reaction products, in the presence of alkaline catalysts, of the following reactants in about the proportions by weight of 80 to 120 parts of an oxidized drying oil, 100 parts of a phenol, 15 to 50 parts of a natural resin and 25 to 100 parts of an aldehyde, the products being soluble in light hydrocarbon oils and in drying oils.

4. As new compositions of matter, the reaction products, in the presence of alkaline catalysts, of about equal amounts of linoxyn and phenol with a minor portion of a natural resin and with formaldehyde, in the proportion of about half a molecule of formaldehyde to one molecule of cresol.

5. As a new varnish, the product of claim 1 dissolved in a light hydrocarbon oil.

6. As a new varnish, the product of claim 4 dissolved in a light hydrocarbon oil.

7. As a new oil varnish, the product of claim 1 dissolved in a solvent comprising a drying oil together with the usual plasticizers and dryers.

8. As a new oil varnish, the product of claim 4 dissolved in a solvent comprising a drying oil together with the usual plasticizers and dryers.

9. In the manufacture of resinous condensation products soluble in light hydrocarbon oils and in drying oils, the process which comprises dissolving an oxidized drying oil in about equal parts of a phenol, adding an alkaline catalyst, approximately half a molecule of an aldehyde for each molecule of phenol in the mixture, and a minor proportion of a natural resin, heating the mixture at about 90° to 100° C. and removing the water.

10. In the manufacture of varnishes, the process of claim 9 followed by dissolving the resulting condensation product in a solvent comprising a drying oil.

ADOLF HECK.